(12) United States Patent
Roberts et al.

(10) Patent No.: US 8,877,506 B2
(45) Date of Patent: Nov. 4, 2014

(54) METHODS AND SYSTEMS USING ENCAPSULATED TRACERS AND CHEMICALS FOR RESERVOIR INTERROGATION AND MANIPULATION

(75) Inventors: Jeffery Roberts, Livermore, CA (US); Roger D. Aines, Livermore, CA (US); Eric B. Duoss, Dublin, CA (US); Christopher M. Spadaccini, Oakland, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 281 days.

(21) Appl. No.: 13/546,925

(22) Filed: Jul. 11, 2012

(65) Prior Publication Data

US 2013/0017610 A1    Jan. 17, 2013

Related U.S. Application Data

(60) Provisional application No. 61/507,044, filed on Jul. 12, 2011.

(51) Int. Cl.
*G01N 33/24* (2006.01)
*C09K 11/06* (2006.01)
*E21B 47/10* (2012.01)

(52) U.S. Cl.
CPC ............. *C09K 11/06* (2013.01); *E21B 47/1015* (2013.01)
USPC .......................................................... 436/27

(58) Field of Classification Search
USPC .......................................................... 436/27
See application file for complete search history.

(56) References Cited

U.S. PATENT DOCUMENTS

| | | | | |
|---|---|---|---|---|
| 3,623,842 A | * | 11/1971 | Deans | 436/27 |
| 3,690,167 A | * | 9/1972 | Chase et al. | 73/152.41 |
| 3,799,261 A | * | 3/1974 | Deans et al. | 166/250.12 |
| 3,847,548 A | * | 11/1974 | Keller | 436/27 |
| 3,851,171 A | * | 11/1974 | Saniford et al. | 250/259 |
| 3,856,468 A | * | 12/1974 | Keller | 436/27 |
| 3,993,131 A | | 11/1976 | Riedel | |
| 4,055,399 A | * | 10/1977 | Parrish | 436/27 |
| 4,058,366 A | * | 11/1977 | Cabbiness | 436/27 |
| 4,168,746 A | * | 9/1979 | Sheely | 166/252.2 |
| 4,303,411 A | | 12/1981 | Chen et al. | |
| 4,420,565 A | * | 12/1983 | Schmitt | 436/27 |
| 4,506,734 A | | 3/1985 | Nolte | |
| 4,555,488 A | | 11/1985 | Schmitt | |
| 5,111,882 A | * | 5/1992 | Tang et al. | 166/252.6 |
| 5,168,927 A | * | 12/1992 | Stegemeier et al. | 166/252.6 |

(Continued)

FOREIGN PATENT DOCUMENTS

WO    WO 03106809 A1    12/2003

OTHER PUBLICATIONS

Mattson et al., "Comparison of Three Tracer Tests at the Raft River Geothermal Site," Proceedings, 36th Workshop on Geothermal Reservoir Engineering Stanford University, CA, Jan. 31-Feb. 2, 2011.

(Continued)

*Primary Examiner* — Arlen Soderquist
(74) *Attorney, Agent, or Firm* — Eddie E. Scott

(57) ABSTRACT

An apparatus, method, and system of reservoir interrogation. A tracer is encapsulating in a receptacle. The receptacle containing the tracer is injected into the reservoir. The tracer is analyzed for reservoir interrogation.

12 Claims, 13 Drawing Sheets

(56) References Cited

U.S. PATENT DOCUMENTS

| | | | |
|---|---|---|---|
| 5,212,093 A * | 5/1993 | Richardson et al. | 436/27 |
| 5,246,860 A | 9/1993 | Hutchins et al. | |
| 5,256,572 A * | 10/1993 | Tang et al. | 436/27 |
| 5,437,331 A | 8/1995 | Gupta et al. | |
| 5,501,273 A * | 3/1996 | Puri | 166/252.5 |
| 5,905,036 A * | 5/1999 | Pope et al. | 435/262 |
| 6,616,946 B1 * | 9/2003 | Meier et al. | 424/489 |
| 6,645,769 B2 * | 11/2003 | Tayebi et al. | 436/56 |
| 6,659,175 B2 * | 12/2003 | Malone et al. | 166/250.1 |
| 6,725,926 B2 * | 4/2004 | Nguyen et al. | 166/254.1 |
| 6,818,594 B1 | 11/2004 | Freeman et al. | |
| 7,032,662 B2 | 4/2006 | Malone et al. | |
| 7,306,040 B1 * | 12/2007 | Robb et al. | 166/300 |
| 7,347,260 B2 | 3/2008 | Ferguson et al. | |
| 7,897,546 B2 * | 3/2011 | Showalter et al. | 507/219 |
| 8,486,702 B2 * | 7/2013 | Nguyen et al. | 436/27 |
| 2003/0006036 A1 * | 1/2003 | Malone et al. | 166/250.12 |
| 2005/0159559 A1 * | 7/2005 | Collins et al. | 525/329.7 |
| 2006/0166838 A1 * | 7/2006 | Collins et al. | 507/219 |
| 2007/0277981 A1 * | 12/2007 | Robb et al. | 166/300 |
| 2008/0283242 A1 * | 11/2008 | Ekstrand et al. | 166/246 |
| 2010/0307744 A1 | 12/2010 | Cocher et al. | |
| 2010/0307745 A1 | 12/2010 | Lafitte et al. | |
| 2012/0207921 A1 * | 8/2012 | Calle et al. | 427/140 |
| 2013/0017612 A1 * | 1/2013 | Li et al. | 436/75 |
| 2013/0126164 A1 * | 5/2013 | Sweatman et al. | 166/282 |

OTHER PUBLICATIONS

Thorsen et al., "Dynamic Pattern Formation in a Vesicle-Generating Microfluidic Device," Physical Review Letters, 86 (18): 4163-4166 (Apr. 30, 2011).

A.S. Utada et al., "Monodisperse DoubleEmulsions Generated from a Microcapillary Device," Science, 308: 537-541, (Apr. 22, 2005).

Shepheard et al., "Microfluidic Assembly of Homogeneous and Janus Colloid-Filled Hydrogel Granules," Langmuria, 22 (21) : 8618-8622 (2006).

* cited by examiner

METHODS AND SYSTEMS USING ENCAPSULATED TRACERS AND CHEMICALS FOR RESERVOIR INTERROGATION AND MANIPULATION

CROSS-REFERENCE TO RELATED APPLICATIONS

This application claims benefit under 35 U.S.C. §119(e) of U.S. Provisional Patent Application No. 61/507,044 filed Jul. 12, 2011 entitled "Encapsulated Tracers for Reservoir Interrogation," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to reservoir interrogation and more particularly to encapsulated tracers for reservoir interrogation.

2. State of Technology

U.S. Pat. No. 4,555,488 for tracer chemicals for a method for determining flow patterns in subterranean petroleum and mineral containing formations using organonitrogen tracers provides the state of technology information reproduced below. The disclosure of U.S. Pat. No. 4,555,488 is incorporated herein in its entirety for all purposes.

In recovery of petroleum or minerals from subterranean formations, especially by chemical flooding, it is desirable to know the flow patterns of the formation prior to injection of chemicals. Tracers are used in such reservoir engineering. In the actual recovery process, during chemical injections, it is advantageous to follow the flow of each slug by using a tracer in the slug. Ideally, a tracer should be water soluble and inert to the solids and liquids in the formation. By inert is meant that it does not get absorbed onto the rocks; it does not partition into any oil phase which may be present; and it does not interact with the organics and minerals present in the formations. When injected with another chemical agent, it should also be inert to the chemical it is injected with. A tracer should also be easily and accurately detected by simple methods without interference by any substances present in the connate fluids.

The tracers now employed are radioactive isotopes and compounds like potassium iodide, ammonium thiocyanate and dichromate. Radioactive isotopes are expensive and require special handling by licensed personnel. Potassium iodide and alike are detected by wet analyses and, therefore, bear the limitations of such analyses.

U.S. Pat. No. 5,246,860 for tracer chemicals for use in monitoring subterranean fluids provides the state of technology information reproduced below. The disclosure of U.S. Pat. No. 5,246,860 is incorporated herein in its entirety for all purposes.

In most production reservoirs, the produced brines are injected into the formation for purposes of maintaining reservoir pressure and avoiding subsidence and environmental pollution. In the case of geothermal fields, the brines are also injected to recharge the formation. However, the injected brines can adversely affect the fluids produced from the reservoir. For example, in geothermal fields, the injected brine can lower the temperature of the produced fluids by mixing with the hotter formation fluids. In order to mitigate this problem, the subsurface paths of the injected fluids must be known.

Tracers have been used to label fluids in order to track fluid movement and monitor chemical changes of the injected fluid. Despite their importance to the reservoir operator, very few tracers are presently available. Furthermore, of those that are available, little is known about their stabilities or behavior at the elevated temperatures that typify geothermal resources capable of electric power generation.

Radioactive materials are one class of commonly used tracers. These tracers have several drawbacks. One drawback is that they require special handling because of the danger posed to personnel and the environment. Another drawback is the alteration by the radioactive materials of the natural isotope ratio indigenous to the reservoir—thereby interfering with scientific analysis of the reservoir fluid characteristics. In addition, the half life of radioactive tracers tends to be either too long or too short for practical use.

United States Patent Application 2010/0307745 for the use of encapsulated tracers provides the state of technology information reproduced below. The disclosure of United States Patent Application 2010/0307745 is incorporated herein in its entirety for all purposes.

The use of tracers to obtain information about an oil reservoir and/or about what is taking place therein has been practiced for several decades and has been described in numerous documents. Primarily tracers have been used to monitor fluid paths and velocities. More than one tracer substance may be used concurrently. For instance U.S. Pat. No. 5,892,147 discloses a procedure in which pluralities of different tracer substances are placed at respective locations along the length of a well penetrating a reservoir. The tracer substances are placed at these locations during completion of the well before production begins. The tracer at each location is either attached to a section of pipe before it is placed at that location or is delivered into the location whilst perforating casing at that location. When production begins, monitoring the proportions of the individual tracers in the oil or gas produced by the well permits calculation of the proportions of oil or gas being produced from different zones of the reservoir.

Distinctive chemicals which can be detected in high dilution, such as fluorocarbons, dyes or fluorescers have been used as tracers. Genetically coded material has been proposed (and WO2007/132137 gives a method for detection of biological tags). Radio-isotopes have frequently been used as tracers. Society of Petroleum Engineers paper SPE109,969 discloses the use of materials which can be activated to become short lived radio-isotopes.

Hydraulic fracturing is a well-established technique for stimulating production from a hydrocarbon reservoir. Typically a thickened, viscous fracturing fluid is pumped into the reservoir formation through a wellbore and fractures the formation. Thickened fluid is then also used to carry a particulate proppant into the fracture. The fracturing fluid is subsequently pumped out and hydrocarbon production is resumed. As the fracturing fluid encounters the porous reservoir formation a filtercake of solids from the fracturing fluid builds up on the surface of the rock constituting the formation. After fracturing has taken place a breaker (which is usually an oxidizing agent, an acid or an enzyme) may be introduced to break down this filter cake and/or to reduce the viscosity of the fluid in the fracture and allow it to be pumped out more effectively.

Tracers have been used in connection with hydraulic fracturing, mainly to provide information on the location and orientation of the fracture, as for instance in SPE 36675 and U.S. Pat. No. 3,987,850. U.S. Pat. No. 3,796,883 describes a further use of radio-active tracers to monitor the functioning of a well gravel pack.

It is known to associate tracers with a carrier material as particles from which the tracer is released after those particles are placed within a subterranean reservoir. For instance U.S. Pat. No. 6,723,683 uses starch particles as a carrier for a variety of oilfield chemicals including tracers. Association of a tracer substance with a carrier is also disclosed in U.S. Pat. No. 7,032,662 and U.S. Pat. No. 7,347,260.

U.S. Pat. No. 6,645,769 proposes that multiple tracers should be located at respective zones of a reservoir during completion of a well and also proposes that individual tracers should be associated with carrier particles from which the tracers are eventually released into the reservoir and hence into fluid produced from the well. This document teaches that placing of tracers at an individual location during completion of the well may be achieved by immobilization on a filter or casing before that filter or section of casing is inserted into the well.

United States Patent Application 2010/0307744 for the use of encapsulated chemical during fracturing provides the state of technology information reproduced below. The disclosure of United States Patent Application 2010/0307744 is incorporated herein in its entirety for all purposes.

It is well-known to deliver so-called oilfield chemicals (using this common term to include chemicals used in connection with either natural gas or oil and to include biochemicals such as nucleic acids and enzymes) to a subterranean hydrocarbon reservoir to bring about a variety of functions at various stages of hydrocarbon production. Methods for delivering oilfield chemicals to a reservoir include methods in which the chemical is made into the form of particles which are suspended in the fluid which is pumped down a wellbore to the reservoir. Common methods for forming particles are absorption into the pores of porous carrier particles and encapsulation as a core-shell structure in which a single quantity (the core) of the oilfield chemical is enclosed within a shell of carrier material.

Hydraulic fracturing is a well-established technique for stimulating production from a hydrocarbon reservoir. In a conventional fracturing procedure a thickened aqueous fracturing fluid is pumped into the reservoir formation through a wellbore and opens a fracture in the formation. Thickened fluid is then also used to carry a particulate proppant into the fracture. Once the fracture has been made and packed with proppant, pumping is stopped. The formation closes onto the proppant pack and oil or gas can flow through the proppant pack to the wellbore. At least some of the aqueous fracturing fluid in the wellbore will be driven back to the surface by fluid produced from the reservoir. Thickener which increases the viscosity of the fracturing fluid may be a polysaccharide. Guar gum, often crosslinked with borate or a zirconium compound is frequently used. Another category of thickeners which is used is viscoelastic surfactants. An oilfield chemical may be delivered to a reservoir during fracturing. If the fracturing fluid contains a viscosifying thickener, it is normal to supply a so-called breaker (which is usually a chemical or an enzyme) into the fracture to degrade the thickener and so reduce the viscosity of the fluid in the fracture after it has served its purpose. This facilitates the flow back to the surface and the flow of produced fluid through the proppant pack towards the wellbore.

U.S. Pat. No. 4,506,734 teaches the encapsulation of a breaker chemical, which may be an enzyme, within particles which are crushed by the fracture when pumping ceases and the fracture is allowed to close onto the proppant pack. This of course delays release of the breaker chemical until the fracture formation is complete.

U.S. Pat. No. 5,437,331 discloses an encapsulated enzyme breaker formed by a procedure in which porous beads of polymer are made and exposed to a solution of the enzyme which is absorbed into the open pores of the polymer beads. Examples in the document showed that this delayed release of the enzyme compared to incorporating enzyme solution directly into a model fracturing fluid.

Proposals for encapsulation of oilfield chemicals in contexts other than hydraulic fracturing include U.S. Pat. No. 6,818,594 which teaches the use of enzymes which are enclosed within a polymer capsule as a breaker for filtercake formed while drilling a well.

International Publication No. WO 03/106809 teaches particles in which an oilfield chemical (in the form of small droplets of aqueous solution) is enclosed in a matrix of an encapsulating polymer. This polymer is chosen so as to be soluble or otherwise degradable under conditions which are encountered within the reservoir after mixing with formation fluid found in the reservoir. The document teaches that these encapsulated particles should be made so small (mean particle diameter below 10 micron) that they can enter the pores of formation rock. Although delivery of particles to a reservoir via a production well is mentioned, an alternative possibility which is suggested is that particles can be delivered to the reservoir via an injection well and then flow through the formation to the vicinity of a production well to release the encapsulated chemical (a scale inhibitor) in the near wellbore region of the production well. This indicates that release of the encapsulated chemical will be sufficiently slow to allow time for travel through the formation from the injection well to the production well.

U.S. Pat. Nos. 4,506,734, 5,437,331, 6,818,594, 7,032,662, 7,347,260 and International Publication No. WO 03/106809 describes the various apparatuses, methods, and systems for encapsulating materials for use in subterranean formations. The disclosures of the above noted U.S. Pat. Nos. 4,506,734, 5,437,331, 6,818,594, 7,032,662, 7,347,260 and International Publication No. WO 03/106809, are incorporated herein in their entirety for all purposes.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

DEFINITION

The following term used in this patent application has the meaning described below:

Tracer—Tracer as used in this application means a chemical which when added to a rock system may be used to infer the structure, flow rates, or chemistry and phase content of that system. The tracer may have defined chemical interactions with the contents of the reservoir, such as dissolving in petroleum or dissolving scale within the reservoir, or it may have very limited or zero interactions so as to maximize physical understanding of the shape, length, and velocity of flow pathways rather than the chemistry of those pathways. Tracers can typically be detected by recovering some of the tracer material at another point in the formation after movement through the formation, but in the usage of this application, tracers can also be detected by their effect on the formation, such that a reservoir property changes in a measurable way so as to make it possible to detect where the tracer has traveled, and/or the extent of its interaction with the formation.

The present invention provides an apparatus, method, and system of reservoir interrogation. A tracer is encapsulated in a receptacle. The receptacle containing the tracer is injected into the reservoir. The tracer is analyzed for reservoir interrogation. In one embodiment the present invention provides a reservoir interrogation apparatus comprising a tracer encapsulated in a receptacle. In one embodiment the receptacle changes chemical constituent or color or fluorescence at a predetermined temperature range or a predetermined condition. In one embodiment the tracer will be released from the receptacle in the reservoir upon pre-determined conditions and an analysis made regarding the collected tracer for reservoir interrogation. In one embodiment the receptacle containing the tracer is collected after being injected into the reservoir and analyzed for reservoir interrogation. In one embodiment multiple tracers are contained in a capsule with multiple concentric shells. The outer shell releases the tracer at the predetermined condition; the second tracer is released at a second predetermined condition. Collection of specific tracers provides information on reservoir conditions and flow pathways within the reservoir. In one embodiment a capsule contains a tracer and a second or third encapsulated distinct tracer (FIG. 14). The outer shell releases the first tracer at the predetermined condition; the additional tracers are still encapsulated. The second and third tracers are only released when a predetermined condition is encountered during flow through the reservoir. Collection of specific tracers at extraction wells provides information on reservoir conditions and flow pathways within the reservoir. In one embodiment numerous distinct tracers each of which is encapsulated in spheres that will release the tracers at specific, distinct predetermined conditions. The design of the shells and the distinct tracers enables interrogation of reservoir conditions and flow pathways by sampling and testing fluid from extraction wells and determining the ratios of released and unreleased tracers. In this way the portions of the reservoir that the flow paths sample and the conditions of the reservoir can be determined. In one embodiment the release of the tracer is controlled by the thickness of the encapsulating wall. In one embodiment the release of the tracer is controlled by the composition of the encapsulating wall.

The release of tracer chemical into the formation may be further controlled by the use of a dual outer shell, where one shell provides mechanical strength but is permeable to the tracer chemical held inside, and the second is impermeable to the tracer chemical but changes permeability dramatically upon achievement of a certain condition, such as temperature, the presence of petroleum, or the presence of a reservoir treating chemical like acid. In FIG. 13; for instance, 1308 may be a silicone shell with high permeability to water and uncharged chemicals, and 1306 may be a polymer whose glass transition temperature is equal to some temperature at which we wish to interrogate the reservoir. The tracer chemical 1302 is held inside the double shell until the temperature is reached, at which time both shells become permeable. This is a preferred method for dealing with situations where the polymer whose properties change at the reservoir condition of interest, such as temperature, is not strong enough on its own to survive transport into the reservoir. This ensures minimal leakage of tracer from capsules that break during handling as well.

Additional improvements may be made. For instance, 1304 may be an additional polymer layer reactive to a second stimulus, requiring two stimuli to be present in order for the release of the tracer chemical. Or 1304 may be a reactive chemical or catalyst which ensures that a reaction occurs between reservoir chemicals, and the tracer chemical contained inside, such that a transformed tracer signal is released from the capsule.

The release of chemical from the encapsulated system may be triggered by reservoir conditions, or it may be triggered by a stimulus applied by the operator, such as an electromagnetic pulse, shock wave, or second injected chemical such as acid. In this way the encapsulated tracer may be released in a time-oriented pulse that transmits information about where the tracer capsules were at the time of the stimulus, providing a capability to map both their ingress to the formation, and the egress of released tracer after the unitary stimulus. One way to achieve this release is to compose the capsule in FIG. 13 as follows: 1306 is the tracer chemical, and 1302 is an explosive material that can be detonated by a shock wave, breaking the capsule and also transmitting the shock wave further into the formation.

Uses of the present invention include interrogation of subsurface reservoirs where information about conditions of the reservoir is needed. Uses of the present invention include applications that currently use conventional tracer techniques.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
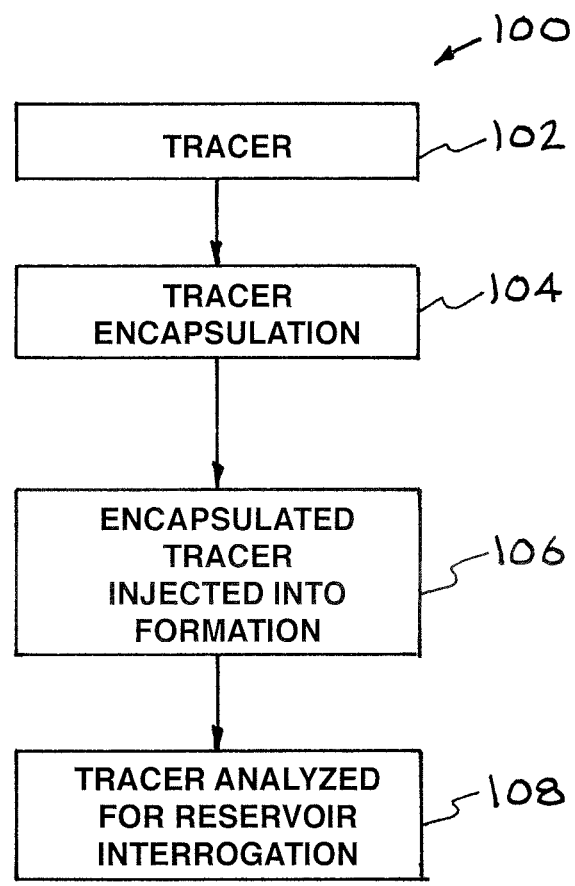
FIG. 1 is a flow chart illustrating a system of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

A common need in geologic reservoirs is information regarding the flow paths, temperature, pressure, and fluid characteristics of the reservoir. This information enables better extraction and management of the resource. Tracers tests are a standard method for obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Referring now to the drawings, and in particular to FIG. 1, the present invention is illustrated by a flow chart. The flow chart illustrates an apparatus, method, and system of reservoir interrogation. The apparatus, method, and system of reservoir interrogation are designated generally by the reference numeral 100.

In step 1 a tracer is provided. Step 1 is designated by the reference numeral 102 in the flow chart of FIG. 1. The tracer is a tracer that can be used in all applications that currently use conventional tracer techniques. In one embodiment the tracer is a standard tracers such as fluorescein disodium hydrate and 2,6-napthalein disulfonic acid sodium salt. The appearance of the tracer and the concentration is commonly measured using HPLC with a fluorescence detector. In various embodiments of the invention multiple tracers are used, each contained in capsules that release the tracer after contact with specific conditions or the capsule is recovered with the capsule intact and the analyzed. In this way, reservoir conditions can be more accurately determined.

The tracer is encapsulating in a receptacle in step 2. Step 2 is designated by the reference numeral 104 in the flow chart of FIG. 1. Additional description and information will be described subsequently, particularly in connection with FIG. 2.

In step 3 the receptacle containing the tracer is injected into the reservoir. Step 3 is designated by the reference numeral 106 in the flow chart of FIG. 1.

In step 4 the tracer is analyzed for reservoir interrogation. Step 4 is designated by the reference numeral 108 in the flow chart of FIG. 1.

Figure 2:
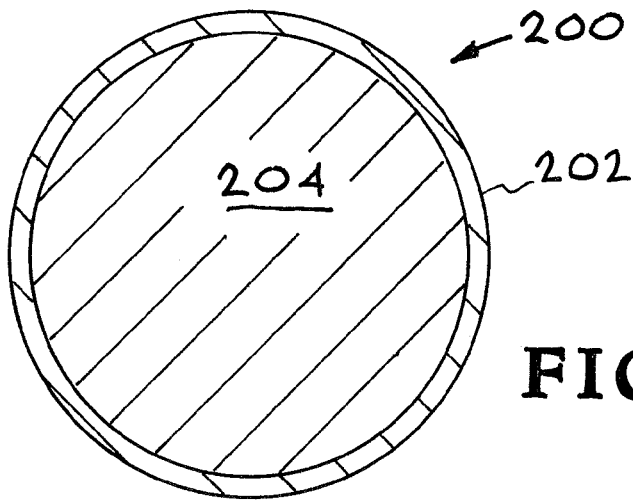
FIG. 2 illustrates an individual encapsulated tracer.
Figure 13:
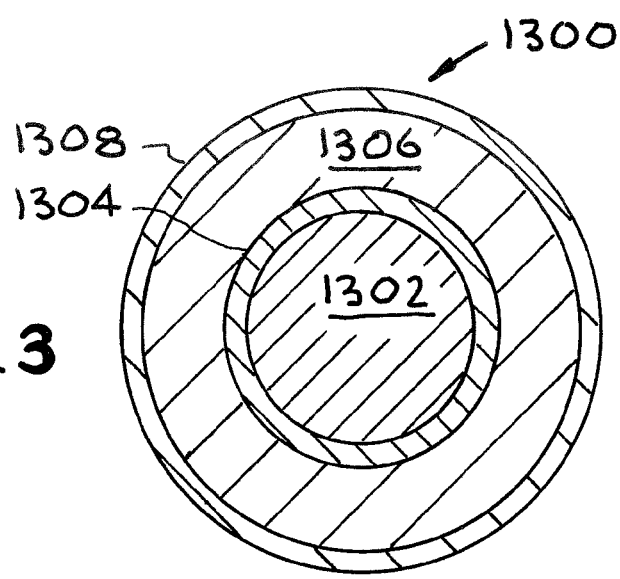
FIG. 13 is an example of the invention wherein two tracers are contained in concentric spheres where the release conditions of each tracer are different.
Figure 14:
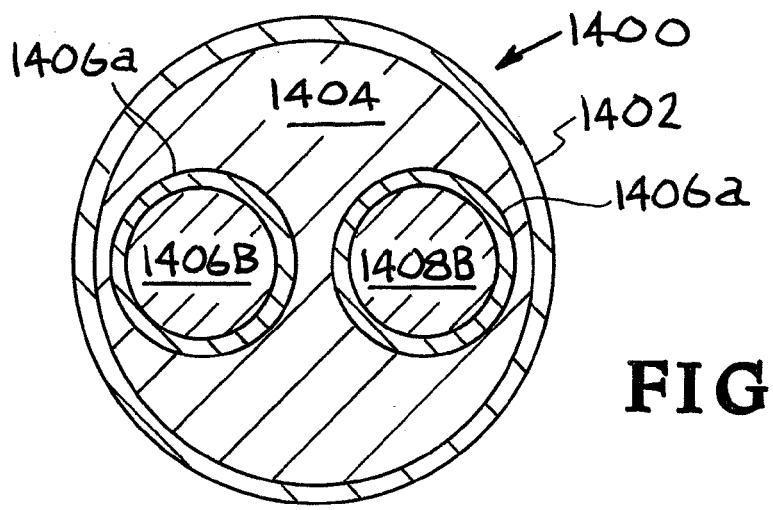
FIG. 14 is an example of the invention wherein multiple spheres of distinct tracers are contained in a single sphere.

The present invention provides a reservoir interrogation apparatus comprising a tracer encapsulated in a receptacle. Referring to FIG. 2, the tracer is shown encapsulating in a receptacle. The encapsulated tracer is designated generally by the reference numeral 200. The encapsulated tracer 200 includes a receptacle 202 and a tracer 204 encapsulated within the receptacle 202. The tracer 204 can be a tracer that can be used in all applications that currently use conventional tracer techniques. This is a groundbreaking improvement in the information that can be obtained from tracer tests while preserving the standard techniques and ease of use of existing tracer materials. No new interrogation techniques would need to be developed. In addition, intact microcapsules could be collected and the interior liquid analyzed for reaction products or other changes as a result of exposure to elevated temperatures or other conditions.

Capsule Making

The present invention provides a method to make capsules and capsules within capsules. A round injection tube that tapers to some opening, typically with an opening diameter from 1-1000 micrometers ($\mu$m), is inserted and secured into a square outer tube wherein the outer diameter (OD) of the round tube, which is typically 0.8-1.5 millimeters (mm), is slightly smaller than the inner diameter (ID) of the square outer tube in order to center the round injection tube within the square outer tube. A round collection tube with an opening diameter typically 2-10 times larger than the opening of the injection tube and an OD equivalent to the injection tube is inserted into the opposite end of the square outer tube typically to within 100-800 $\mu$m of the injection tube and secured in place. Liquid-tight connections are made to deliver the inner (core) fluid to the injection tube, the middle (shell) fluid to the interstitial space between the round injection tube and the square outer tube, and the outer (collection) fluid to the interstitial space between the round collection tube and the square outer tube. Each fluid is delivered with a controlled volumetric flow rate where flows for the middle and outer fluids are typically 10-1000 times the inner fluid flow rate with typical flow rates on the order of 100-1000 $\mu$l/h. In operation, the inner fluid 708 with a viscosity of 1-1000 (cP) flows in the injection tube. As the inner fluid proceeds down the channel it passes through the tapered injection tube which is a droplet forming nozzle. The formed droplet is released from the nozzle and becomes encased in a spherical shell of the middle fluid 7; which has a viscosity of 10-100 times that of the inner fluid. The inner fluid droplet becomes encased in the middle fluid forming an encapsulated microcapsule that has a core with a thin outer shell. The outer fluid, with a viscosity of 10-100 times the inner fluid, flows in the outer tube and hydro dynamically flow focuses to sever and form the microcapsules at the active zone between the injection tube opening and downstream up to several millimeters within the collection tube. This outer fluid carries the microcapsules into a collection container. The microcapsules can range from approximately 10-1000's $\mu$m in diameter with shell thicknesses that range from approximately 5-25% of the capsule diameter. Both the diameter and the shell thickness are tunable by changing the microfluidic geometry or the fluid viscosities and flow rates. The shell may be treated so that it undergoes a liquid to solid transition via routes such as photocrosslinking and interfacial polymerization. In addition, multiple devices may be stacked in sequence or multiple devices may be fed into a single device so that capsules within capsules may be formed with different inner fluids contained within each capsule while also controlling the number of capsules within a larger capsule.

Systems for producing microcapsules are described in U.S. Pat. No. 7,776,927 and in U.S. Published Patent Application Nos. 2009/0012187 and 2009/0131543 which are incorporated herein by reference. U.S. Pat. No. 7,776,927 to Liang-Yin Chu et al., assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a liposome, a polymerosome, or a colloidosome. As described below, multiple emulsions can be formed in one step in certain embodiments, with generally precise repeatability, and can be tailored to include one, two, three, or more inner droplets within a single outer droplet (which droplets may all be nested in some cases). As used herein; the term "fluid", generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

The present invention provides benefits in fabrication and manufacturability. The beads can be fabricated at a size small enough for efficient mass transfer and large enough for ease of handling. The present invention provides methods to fabricate liquid filled shells in the size range of 100 microns to 1 mm with wall thickness from 5-10 microns. The present invention provides benefits in survivability and robustness. The present invention identifies several polymers that can withstand typical regeneration temperatures of 100-150 C. In addition, the selected polymers will be capable of withstanding small volumetric changes due to absorption desorption of water.

Microcapsules

The encapsulated tracer 200 in some embodiments can be a microcapsule or microcapsules. The microcapsules will be made of different materials and different wall thicknesses to achieve the desired result. This is, for instance, dissolution of the capsule and release of the tracer after immediate exposure to a temperature (or fluid composition) of interest followed by release of a second, or third tracer after prolonged exposure to the same release trigger. In this way, tracers can be designed to specifically interrogate for the property of interest In one embodiment; liquid-filled microcapsules are made with very thin polymer shells. This invention specifically deals with the combination of the contents of the capsules, which will be the typical tracer chemical previously described or new reactant mixtures, with the shell materials and geometry. These shells can be any number of polymer or other materials which are designed to dissolve, erode, or otherwise degrade under specific environmental conditions such as elevated temperature or specific chemical exposure.

Applicants use existing microfluidic assembly techniques as a platform for creating droplets that contain a given tracer or other reactant mixture polymer skin which can dissolve or erode as desired releasing the tracer. Additionally, the shell can be designed to stay completely intact if desired. The fabrication technology allows Applicants to control the size and skin thickness, and polydispersity of the capsules. Typically, once the droplets form, the applicants cure and the shell material to form a solid shell via UV photopolymerization; however other means of curing such as interfacial polymerization and thermal treatment are possible. The polymer surface layer 202 can be made of any of several families of polymerizable or crosslink-able materials, including silicones and siloxanes such as polydimethylsiloxane, polymers such as polyimides, polyamides, polyacrylates, polyurethanes, and adhesives such as epoxies and mercapto-esters, and other materials.

The present invention will be further explained, illustrated, and described in the following examples of systems of the present invention. The examples demonstrate the utility and/or function of the invention help provide a full describe of the invention. The technological field will dictate the relative importance of inclusion of examples in a patent application.

Example 1

Figure 3:
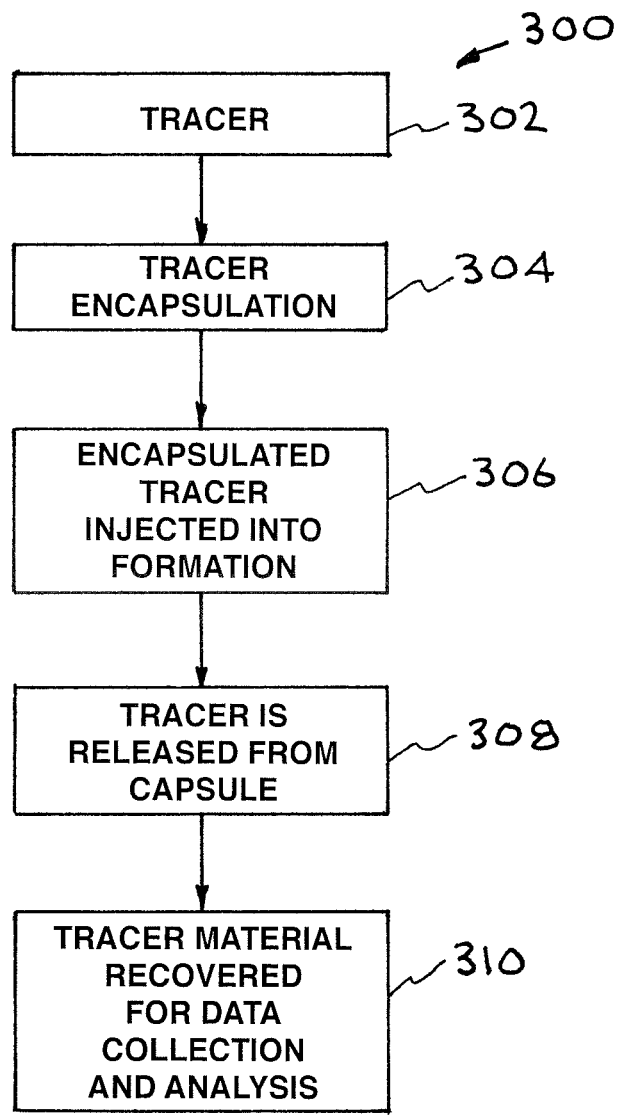
FIG. 3 is a flow chart illustrating an example of the invention wherein the tracer is released into the reservoir.

Referring now to FIG. 3, one example of the present invention is illustrated by a flow chart. The flow chart illustrates an apparatus, method, and system of reservoir interrogation. The apparatus, method, and system of reservoir interrogation are designated generally by the reference numeral 300.

In step 1 a tracer is provided. Step 1 is designated by the reference numeral 302 in the flow chart of FIG. 3. The tracer is a tracer that can be used in all applications that currently use conventional tracer techniques. In one embodiment the tracer is a standard tracers such as fluorescein disodium hydrate and 2,6-napthalein disulfonic acid sodium salt. The appearance of the tracer and the concentration is commonly measured using HPLC with a fluorescence detector. In various embodiments of the invention multiple tracers are used, each contained in receptacles that release the tracer after contact with specific conditions or the receptacle is recovered with the receptacle intact and the analyzed. In this way, reservoir conditions can be more accurately determined.

The tracer is encapsulating in a receptacle in step 2. Step 2 is designated by the reference numeral 304 in the flow chart of FIG. 3. The receptacle can be made of different materials and different wall thicknesses to achieve the desired result. For instance, dissolution of the receptacle and release of the tracer after exposure to a pre-determined temperature or fluid composition or pressure receptacle can be accomplished by dissolution of the receptacle and release of the tracer after exposure to a pre-determined temperature or fluid composition or pressure. The combination of the contents of the receptacles, which will be the typical tracer chemical previously described or new reactant mixtures, with the shell materials and geometry. These shells can be any number of polymer or other materials which are designed to dissolve, erode, or otherwise degrade under specific environmental conditions such as elevated temperature or specific chemical exposure.

In step 3 the receptacle containing the tracer is injected into the reservoir. Step 3 is designated by the reference numeral 306 in the flow chart of FIG. 3. The receptacle changes chemical constituent or color or fluorescence at a predetermined condition. For example, the tracer can be released from the receptacle in the reservoir upon pre-determined conditions and an analysis made regarding the collected tracer material for reservoir interrogation.

In step 4 the tracer is analyzed for reservoir interrogation. Step 4 is designated by the reference numeral 308 in the flow chart of FIG. 3. For example, the tracer can be analyzed for reservoir interrogation using tests that are a standard method for obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Example 2

Figure 4:
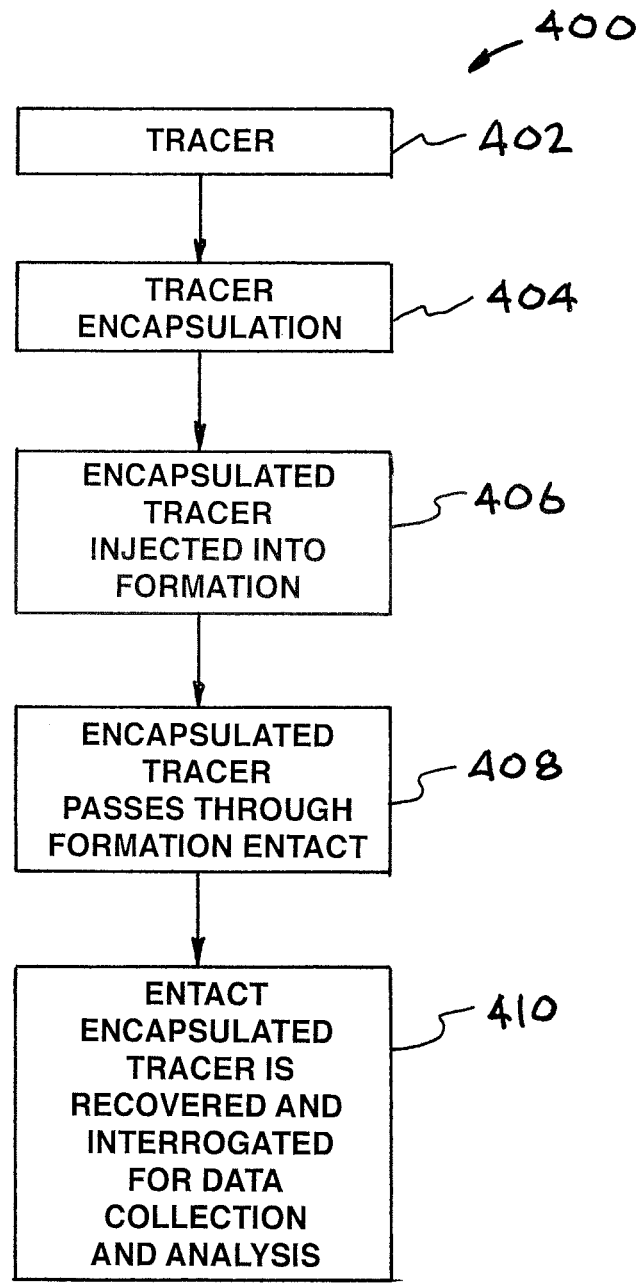
FIG. 4 is a flow chart illustrating an example of the invention wherein the encapsulated tracer remains intact as it passes through the reservoir.

Referring now to FIG. 4, another example of the present invention is illustrated by a flow chart. The flow chart illustrates an apparatus, method, and system of reservoir interrogation. The apparatus, method, and system of reservoir interrogation are designated generally by the reference numeral 400.

In step 1 a tracer is provided. Step 1 is designated by the reference numeral 402 in the flow chart of FIG. 4. The tracer is a tracer that can be analyzed for reservoir interrogation after being encapsulated in a receptacle and the receptacle being injected into the reservoir and recovered. In various embodiments of the invention multiple tracers are used, each contained in receptacles that are recovered with the receptacles intact and the tracer analyzed. In this way, reservoir conditions can be more accurately determined.

The tracer is encapsulating in a receptacle in step 2. Step 2 is designated by the reference numeral 404 in the flow chart of FIG. 4. The receptacle can be made of different materials and different wall thicknesses to achieve the desired result. The combination of the contents of the receptacle with the pre-determined shell materials and geometry. These shells can be any number of polymer or other materials.

In step 3 the receptacle containing the tracer is injected into the reservoir. Step 3 is designated by the reference numeral 406 in the flow chart of FIG. 4. The receptacle changes chemical constituent or color or fluorescence upon encountering predetermined conditions. For example, the tracer within the receptacle travels into the reservoir and encounters the pre-determined conditions. The receptacle is recovered intact and analysis made of the tracer material for reservoir interrogation.

In step 4 the receptacle is recovered intact and the tracer material is analyzed for reservoir interrogation. Step 4 is designated by the reference numeral 408 in the flow chart of FIG. 4. For example, the tracer can be analyzed for reservoir interrogation and obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Example 3

Figure 5A:
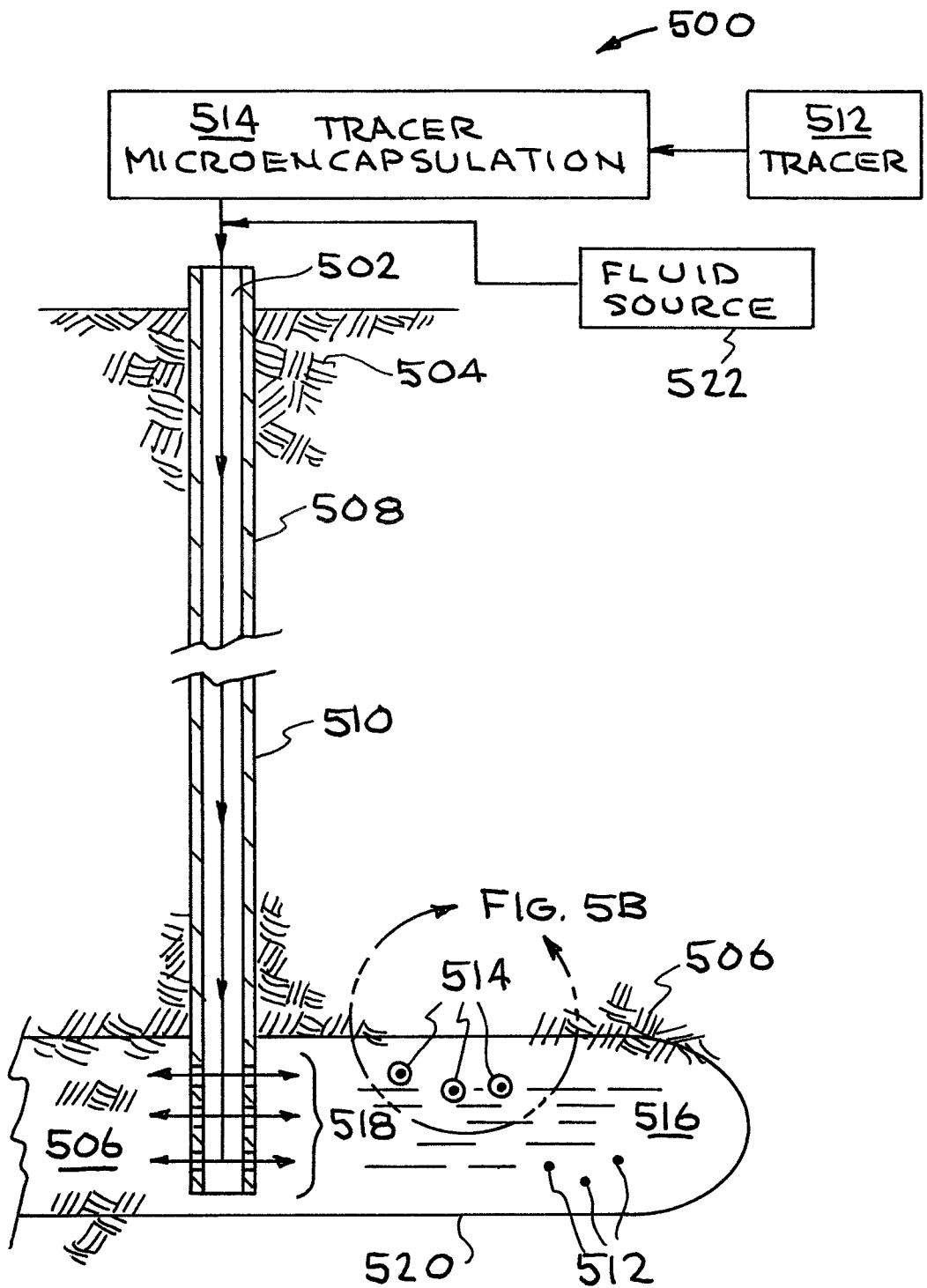
FIGS. 5A and 5B illustrate an example of the invention wherein an example of the invention wherein the tracer is released into the reservoir.
Figure 5B:
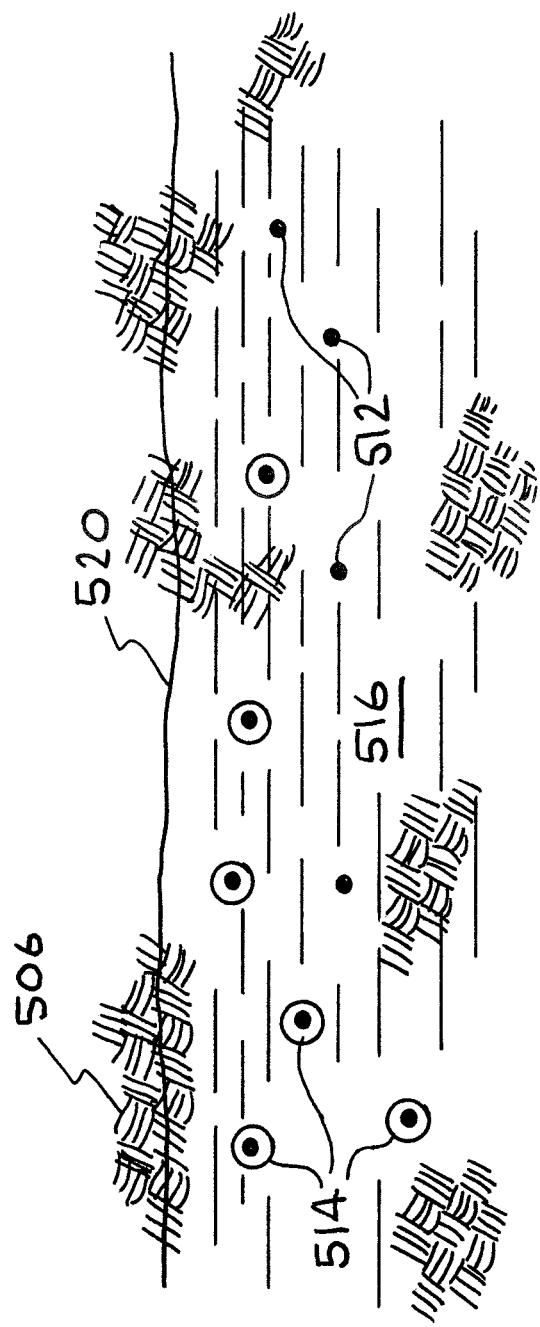

Referring now to FIGS. 5A and 5B, an example of a system of the present invention is illustrated. The system is designated by the reference numeral 500. As shown in FIG. 5A, a well 502 is illustrated extending into the earth 504 and into a formation 506 penetrated by the well 502. The well 502 is shown having a borehole 508 extending into the earth 504 and into the formation 506. The well 502 is shown with a casing 510. The well 502 extends into a reservoir 516.

The system 500 provides a method of interrogation of the reservoir 516. A tracer 512 is encapsulated providing a microencapsulation tracer 514. The microencapsulation tracer 514 is injected into the well 502 that is lined by the casing 510 and continues until it is injected into the reservoir 516 as indicated by the arrows 518. The reservoir 516 is formed in the formation 506 and is defined by the boundary 520.

The microencapsulated tracer 512 will be released from the microcapsule 514 when it comes into contact with fluids of a predetermined temperature or a predetermined chemistry or a predetermined time. The microcapsule 514 containing the tracer 512 is shown being injected into the reservoir 516 by the arrow 518. The tracer 512 is shown near the boundary 520 of the reservoir 516 after having been released when it comes into contact with fluids of a predetermined temperature, a predetermined chemistry, or a predetermined time, or a pre-determined pressure, etc.

The microencapsulated tracer 114 includes a shell having a reactant in the shell that changes at a predetermined temperature range, pressure, or other predetermined condition. The combination of the contents of the microencapsulated tracer 114, which can be a prior art tracer chemical or new reactant mixtures with shell materials and geometry. These shells can be any number of polymer or other materials which are designed to dissolve, erode, or otherwise degrade under specific environmental conditions such as elevated temperature or specific chemical exposure. Wall thickness on these shells can be controlled via the fabrication process and typically can range from ~10-100 um for overall capsule diameters of ~50-500 um.

Applicants have used existing microfluidic assembly techniques as a platform for creating droplets that contain a given tracer or other reactant mixture polymer skin which can dissolve or erode as desired releasing the tracer. The fabrication technology allows Applicants to control the size and skin thickness, and polydispersity of the capsules. Typically, once the droplets of the tracer form. Applicants cure and polymer shell via UV photopolymerization; however other means of curing such as interfacial polymerization and thermal treatment are possible.

In the production of petroleum or minerals from subterranean formations one must be knowledgeable about the formation. Tracers are used in such reservoir engineering. The present invention provides tracers that are contained in microcapsules. The microencapsulation of tracers relies on the ability to contain the tracer, inject the tracer into a geologic formation as part of a standard tracer test, and recover the tracer once it is released from the capsule. By preparing capsules of the appropriate material and wall thickness, the tracer will only be released when it comes into contact with fluids of the appropriate temperature, chemistry, or time.

Tracers tests are a standard method for obtaining information about the interconnectedness of individual wells, pathways, sweep efficiency, reservoir storage volume, and the types of fluid at depth (through the use of tracers that have distinct distribution coefficients). The microencapsulated tracers of the present invention will enable the collection of valuable additional information such as temperature, pressure, and fluid composition. A significant advantage of the proposed technique over other developing SMART tracer technologies is that the proposed technique uses standard tracers that are relatively easy to use and interpret. Fluid pumped from a production well can be analyzed in the standard way. The user will look for breakthrough, the first occurrence of the tracer, to determine if the microencapsulated tracer has been released, and if it has, the interpretation is that the release was triggered by the design of the capsule. The intent is to create suites of tracers that have different responses to the reservoir. For instance, the appearance in production fluid of a tracer encapsulated so that the tracer is released at a specific temperature will inform the operator that parts of the reservoir exceed the release temperature. Suites of encapsulated tracers designed to release the tracer at distinct conditions of interest can provide a more complete picture of reservoir conditions in this manner.

The present invention utilizes standard tracers such as fluorescein disodium hydrate and 2,6-napthalein disulfonic acid sodium salt. The appearance of tracers, and the concentration is commonly measured using HPLC with a fluorescence detector. Any standard tracer can be used. In different embodiments, the invention uses multiple tracers, each contained in microcapsules that release the tracer after contact with specific conditions. In this way, reservoir conditions can be more accurately determined.

The microcapsules will be made of different materials and different wall thicknesses to achieve the desired result. This is, for instance, dissolution of the capsule and release of the tracer after immediate exposure to a temperature (or fluid composition) of interest followed by release of a second, or third tracer after prolonged exposure to the same release trigger. In this way, tracers can be designed to specifically interrogate for the property of interest. This is a groundbreaking improvement in the information that can be obtained from tracer tests while preserving the standard techniques and ease of use of existing tracer materials. No new interrogation techniques would need to be developed. In addition, intact microcapsules could be collect and the interior liquid analyzed for reaction products or other changes as a result of exposure to elevated temperatures or other conditions.

FIG. 5B is the enlarge section of FIG. 5A providing more details of the reservoir 516. As shown in FIG. 5B, the system 500 provides a method of interrogation of the reservoir 516. A tracer 512 is encapsulated providing a microencapsulation tracer 514. The microencapsulation tracer 514 is injected into the reservoir 516 as defined by the boundary 520. The microencapsulated tracer 512 is shown released from the microcapsule 514 after it has come into contact with fluids of a predetermined temperature or a predetermined pressure or a predetermined chemistry or a predetermined time or other predetermined conditions.

In the production of petroleum or minerals from subterranean formations tracers are used in reservoir interrogation. The present invention provides tracers that are contained in microcapsules. The microencapsulation of tracers relies on the ability to contain the tracer, inject the tracer into a geologic formation as part of a standard tracer test, and recover the tracer once it is released from the capsule. By preparing capsules of the appropriate material and wall thickness, the tracer will only be released when it comes into contact with fluids of the appropriate temperature, chemistry, or time.

The microcapsules 514 are made of different materials and different wall thicknesses to achieve the desired result. This is, for instance, dissolution of the capsule and release of the tracer after immediate exposure to a temperature (or fluid composition) of interest followed by release of a second, or third tracer after prolonged exposure to the same release trigger. In this way, tracers can be designed to specifically interrogate for the property of interest. This is a groundbreaking improvement in the information that can be obtained from tracer tests while preserving the standard techniques and ease of use of existing tracer materials. No new interrogation techniques would need to be developed. In addition, intact microcapsules could be collect and the interior liquid analyzed for reaction products or other changes as a result of exposure to elevated temperatures or other conditions.

Example 4

Figure 6:
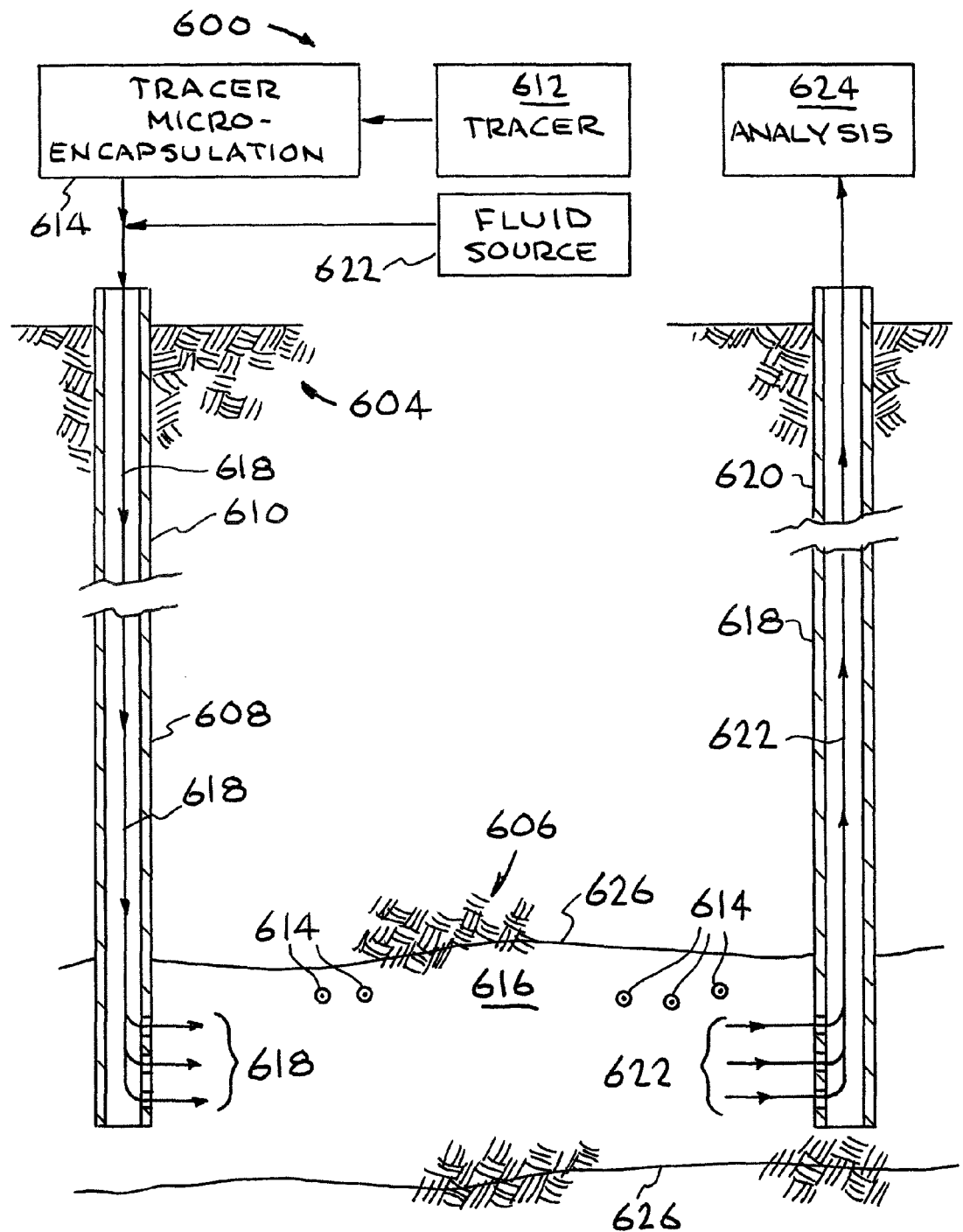
FIGS. 6, 7, and 8 illustrate an example of the invention wherein the encapsulated tracer remains intact as it passes through the reservoir.
Figure 7:
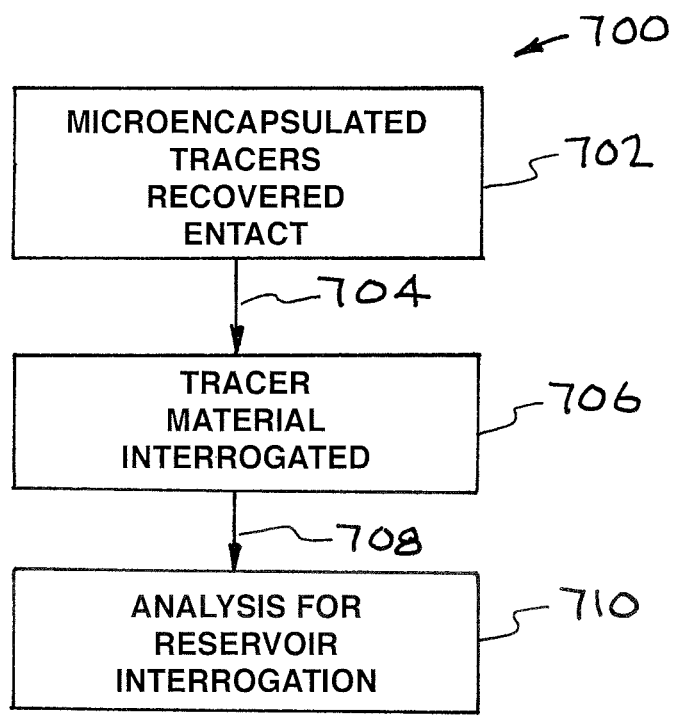
Figure 8:
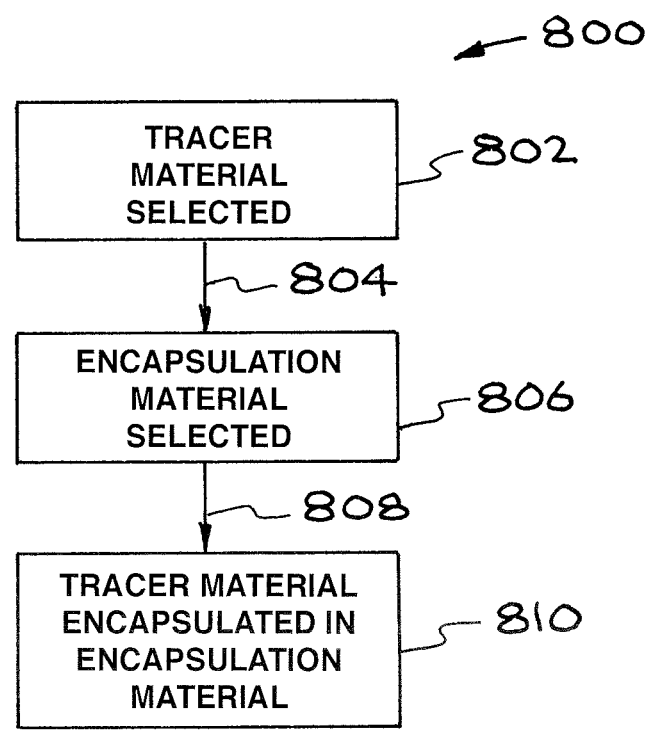

Referring now to FIGS. 6, 7, and 8 an example of a system of the present invention is illustrated. The system is designated by the reference numeral 600. An injection well 602 is shown extending into the earth 604 and into a formation 606 penetrated by the well 602. The injection well 602 is shown having a borehole 608 extending into the earth 604 and into the formation 606. The injection well 602 is shown with a casing 610. The injection well 602 extends into a reservoir 616.

The system 600 provides a method of interrogation of the reservoir 616. A tracer 612 is encapsulated providing a microencapsulation tracer 614. The microencapsulated tracer 614 is fed into the injection well 602 that is lined by the casing 610 and continues into the reservoir 616 as indicated by the arrows 618. The reservoir 616 is formed in the formation 606 and is defined by the boundary 626. The microencapsulated tracer 614 will come into contact with fluids in the reservoir 616 having a predetermined condition or conditions. The microencapsulated tracer 614 is drawn into the recovery well 618 that is lined by the casing 620 and continues to the analysis unit 624 as indicated by the arrows 618. The analysis unit 624 will be described in greater detail subsequently.

The tracer material 612 in microencapsulated tracer 614 will have a change in characteristics when it comes into contact with fluids having a predetermined condition or conditions and effectively record the predetermined condition or conditions. The microcapsules are made of different materials and different wall thicknesses to achieve the desired result.

This is, for instance, to record exposure to a temperature or fluid characteristic of interest. In this way the tracer 612 can be designed to specifically interrogate for the property of interest. The intact microencapsulated tracer 614 is collected through the recovery well 618 and the interior material analyzed for reaction products or other changes as a result of exposure to elevated temperatures or other conditions in the reservoir 616.

Referring now to FIG. 7, a flow chart illustrate illustrates analysis of the tracer for reservoir interrogation. The analysis of the tracer for reservoir interrogation is designated generally by the reference numeral 700.

The microencapsulated tracer is drawn into the recovery well and continues to the analysis unit. The microencapsulated tracer is recovered intact as illustrated by the box 702.

The arrow 704 illustrates that the microencapsulated tracer is interrogated. The chemical constituent, color, fluorescence, or other property of the tracer material in the encapsulated trace has been altered, activated, and/or modified as it passes through specific temperature ranges, pressure ranges, chemical condition and/or other conditions in the reservoir. The tracer material in the microencapsulated tracer is interrogated as illustrated by the box 706. The tracer material is interrogated (optically, chemically, etc.) to determine the conditions to which they were exposed.

The arrow 708 illustrates that data from interrogation of the material in the tracer is analyzed. The analysis includes, but is not limited to, analysis for geothermal brine, crude oil, ground water, hazardous waste, and injected fluids used in enhanced oil recovery operations, e.g., steam floods, carbon dioxide floods, caustic floods, micellar-polymer floods, and straight polymer floods.

Referring now to FIG. 8, a flow chart illustrate illustrates the encapsulation of the tracer material. The encapsulation is designated generally by the reference numeral 800. The tracer material is selected as indicated by the box 802. The tracer material may be a typical tracer chemical or a new reactant mixture. The tracer material is selected to be a material whose chemical constituent, color, fluorescence, or other property will be altered, activated, and/or modified as it passes through specific temperature ranges, pressure ranges, chemical condition and/or other conditions in the reservoir. This includes a material whose chemical constituent, color, fluorescence, or other property will be altered, activated, and/or modified by the fluid of a geothermal brine, crude oil, ground water, hazardous waste, and injected fluids used in enhanced oil recovery operations, e.g., steam floods, carbon dioxide floods, caustic floods, micellar-polymer floods, and straight polymer floods.

Once the tracer material has been selected the encapsulation material needs to be selected as indicated by the arrow 804. The encapsulation material is selected as indicated by the box 806. The encapsulation material in some embodiments can be a material suitable for creating microcapsules. The microcapsules will be made of different materials and different wall thicknesses to achieve the desired result. In one embodiment, liquid-filled microcapsules are made with very thin polymer shells. The shells can be any number of polymer or other materials that will withstand specific environmental conditions such as elevated temperature or specific chemical exposure. Wall thickness on these shells can be controlled via the fabrication process and typically can range from −10-100 um for overall capsule diameters of −50-500 um.

Once the encapsulation material has been selected the encapsulation of the tracer material in the encapsulation material needs to be completed as indicated by the arrow 808. The encapsulation of the tracer material in the encapsulation material is indicated by the box 806. Applicants use existing microfluidic assembly techniques as a platform for creating droplets that contain a given tracer or other reactant mixture polymer skin which will stay completely intact. The fabrication technology allows Applicants to control the size and skin thickness, and polydispersity of the capsules. Typically, once the droplets form. Applicants cure and polymer shell via UV photopolymerization; however other means of curing such as interfacial polymerization and thermal treatment are possible. The polymer surface layer can be made of any of several families of polymers, including polystyrene, polyethylene, polypropylene, nylon, and others.

Example 5

Figure 9:
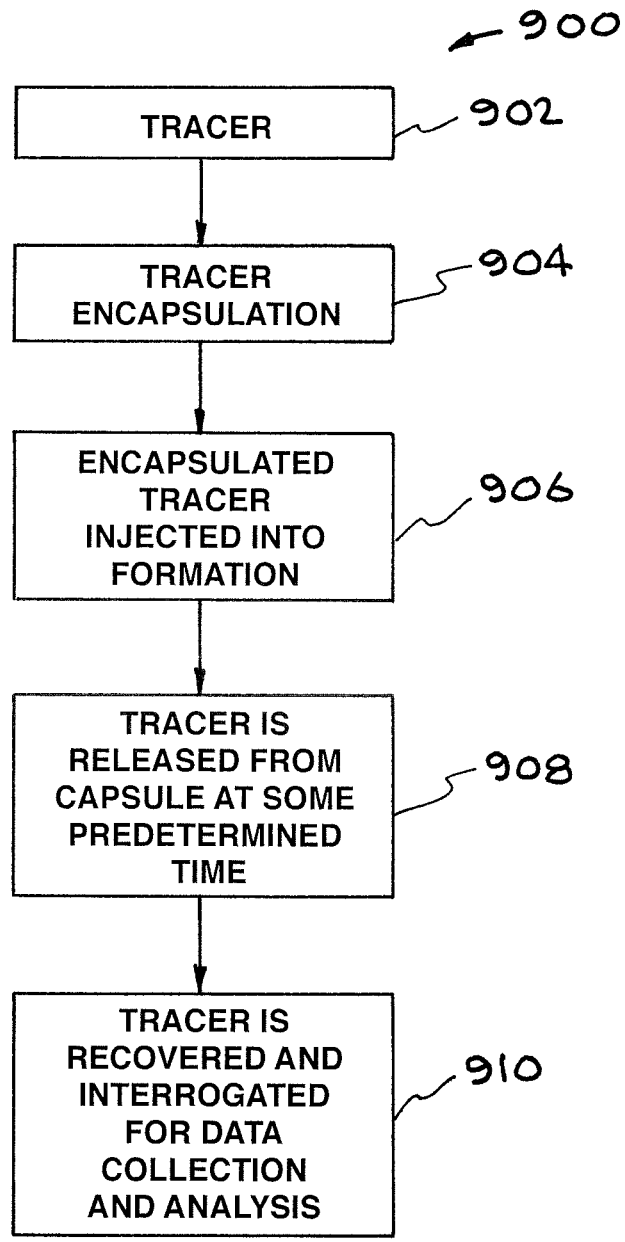
FIG. 9 is an example of the invention wherein the tracer is released into the reservoir at a predetermined time.

Referring now to FIG. 9, another example of the present invention is illustrated by a flow chart. The flow chart illustrates an apparatus, method, and system of reservoir interrogation. The apparatus, method, and system of reservoir interrogation are designated generally by the reference numeral 900.

In step 1 a tracer is provided. Step 1 is designated by the reference numeral 902 in the flow chart of FIG. 9. The tracer is a tracer that can be used in all applications that currently use conventional tracer techniques. In one embodiment the tracer is a standard tracers such as fluorescein disodium hydrate and 2,6-napthalein disulfonic acid sodium salt. The appearance of the tracer and the concentration is commonly measured using HPLC with a fluorescence detector. In various embodiments of the invention multiple tracers are used, each contained in capsules that release the tracer after contact with specific conditions or the capsule is recovered with the capsule intact and the analyzed. In this way, reservoir conditions can be more accurately determined.

The tracer is encapsulating in a receptacle in step 2. Step 2 is designated by the reference numeral 904 in the flow chart of FIG. 9. The receptacle can be made of different materials and different wall thicknesses to achieve the desired result. The receptacle is designed to release the tracer after a pre-determined time. The receptacle shell can be any number of polymer or other materials which are designed to dissolve, erode, or otherwise degrade after a specific time.

In step 3 the receptacle containing the tracer is injected into the reservoir. Step 3 is designated by the reference numeral 906 in the flow chart of FIG. 9.

In step 4 the receptacle releases the tracer after the predetermined time. Step 4 is designated by the reference numeral 908 in the flow chart of FIG. 9.

In step 5 the tracer is recovered and analyzed for reservoir interrogation. Step 5 is designated by the reference numeral 910 in the flow chart of FIG. 9. For example, the tracer can be analyzed for reservoir interrogation using tests that are a standard method for obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Example 6

Figure 10:
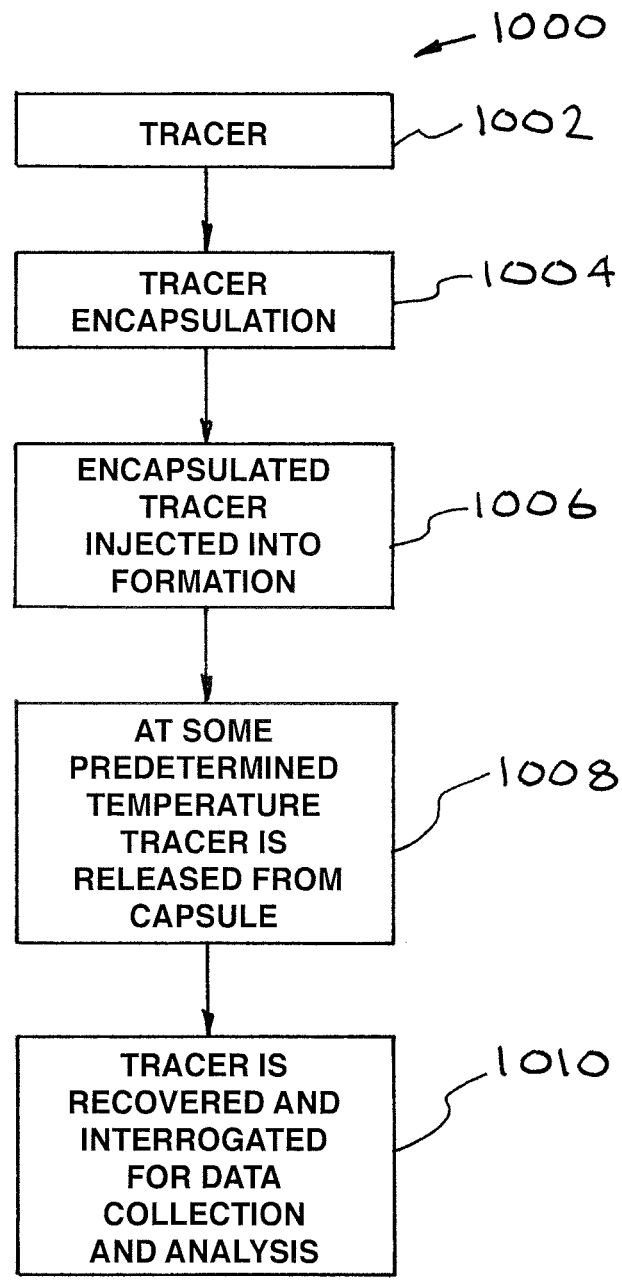
FIG. 10 is an example of the invention wherein the tracer is released into the reservoir at a predetermined temperature.

Referring now to FIG. 10, another example of the present invention is illustrated by a flow chart. The flow chart illustrates an apparatus, method, and system of reservoir interrogation. The apparatus, method, and system of reservoir interrogation are designated generally by the reference numeral 1000.

In step 1 a tracer is provided. Step 1 is designated by the reference numeral 1002 in the flow chart of FIG. 10. The tracer is a tracer that can be used in all applications that currently use conventional tracer techniques. In one embodiment the tracer is a standard tracers such as fluorescein disodium hydrate and 2,6-napthalein disulfonic acid sodium salt. The appearance of the tracer and the concentration is commonly measured using HPLC with a fluorescence detector. In various embodiments of the invention multiple tracers are used, each contained in capsules that release the tracer after contact with specific conditions or the capsule is recovered with the capsule intact and the analyzed. In this way, reservoir conditions can be more accurately determined.

The tracer is encapsulating in a receptacle in step 2. Step 2 is designated by the reference numeral 1004 in the flow chart of FIG. 10. The receptacle can be made of different materials and different wall thicknesses to achieve the desired result. The receptacle is designed to release the tracer after exposure to a pre-determined temperature. The receptacle shell can be any number of polymer or other materials which are designed to dissolve, erode, or otherwise degrade under specific environmental conditions of temperature.

In step 3 the receptacle containing the tracer is injected into the reservoir. Step 3 is designated by the reference numeral 1006 in the flow chart of FIG. 10.

In step 4 the receptacle releases the tracer at the predetermined temperature. Step 4 is designated by the reference numeral 1008 in the flow chart of FIG. 10.

In step 5 the tracer is recovered and analyzed for reservoir interrogation. Step 5 is designated by the reference numeral 1010 in the flow chart of FIG. 10. For example, the tracer can be analyzed for reservoir interrogation using tests that are a standard method for obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Example 7

Figure 11:
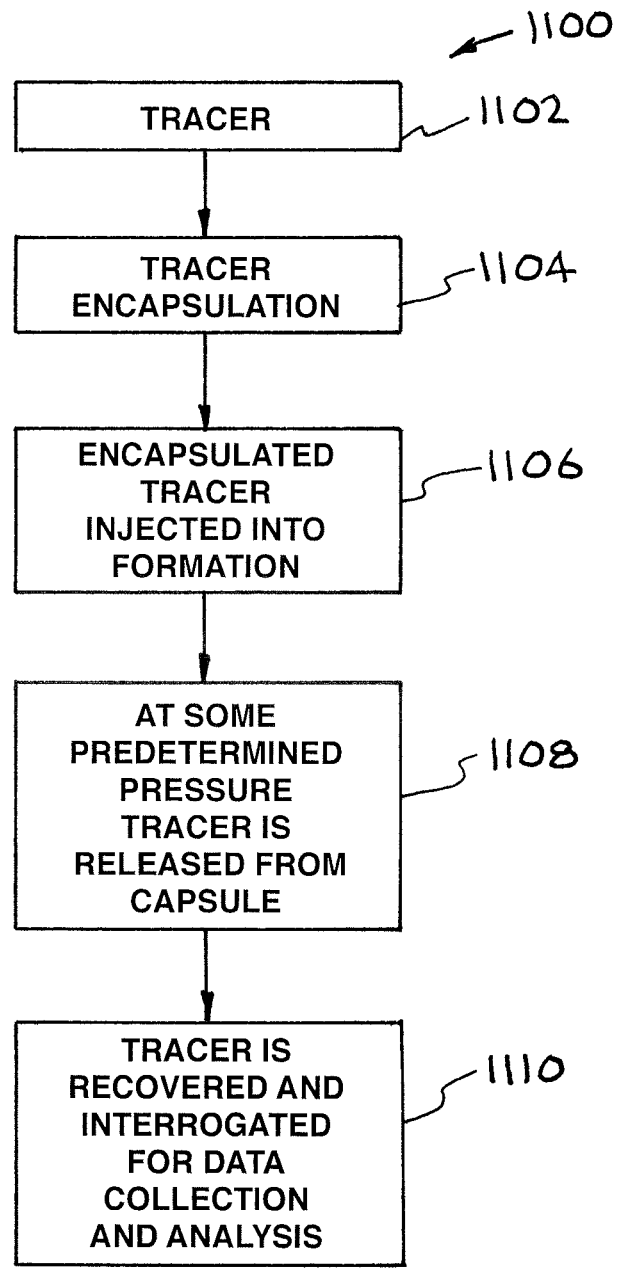
FIG. 11 is an example of the invention wherein the tracer is released into the reservoir at a predetermined pressure.

Referring now to FIG. 11, another example of the present invention is illustrated flow chart. The flow chart illustrates an apparatus, method, and system of reservoir interrogation. The apparatus, method, and system of reservoir interrogation are designated generally by the reference numeral 1100.

In step 1 a tracer is provided. Step 1 is designated by the reference numeral 1102 in the flow chart of FIG. 11. The tracer is a tracer that can be used in all applications that currently use conventional tracer techniques. In one embodiment the tracer is a standard tracers such as fluorescein disodium hydrate and 2,6-napthalein disulfonic acid sodium salt. The appearance of the tracer and the concentration is commonly measured using HPLC with a fluorescence detector. In various embodiments of the invention multiple tracers are used, each contained in capsules that release the tracer after contact with specific conditions or the capsule is recovered with the capsule intact and the analyzed. In this way, reservoir conditions can be more accurately determined.

The tracer is encapsulating in a receptacle in step 2. Step 2 is designated by the reference numeral 1104 in the flow chart of FIG. 11. The receptacle can be made of different materials and different wall thicknesses to achieve the desired result. The receptacle is designed to release the tracer after exposure to a pre-determined pressure. The receptacle shell can be any number of polymer or other materials which are designed to dissolve, erode, or otherwise degrade under specific environmental conditions of pressure.

In step 3 the receptacle containing the tracer is injected into the reservoir. Step 3 is designated by the reference numeral 1106 in the flow chart of FIG. 11.

In step 4 the receptacle releases the tracer at the predetermined pressure. Step 4 is designated by the reference numeral 1108 in the flow chart of FIG. 11.

In step 5 the tracer is recovered and analyzed for reservoir interrogation. Step 5 is designated by the reference numeral 1110 in the flow chart of FIG. 11. For example, the tracer can be analyzed for reservoir interrogation using tests that are a standard method for obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Example 8

Figure 12:
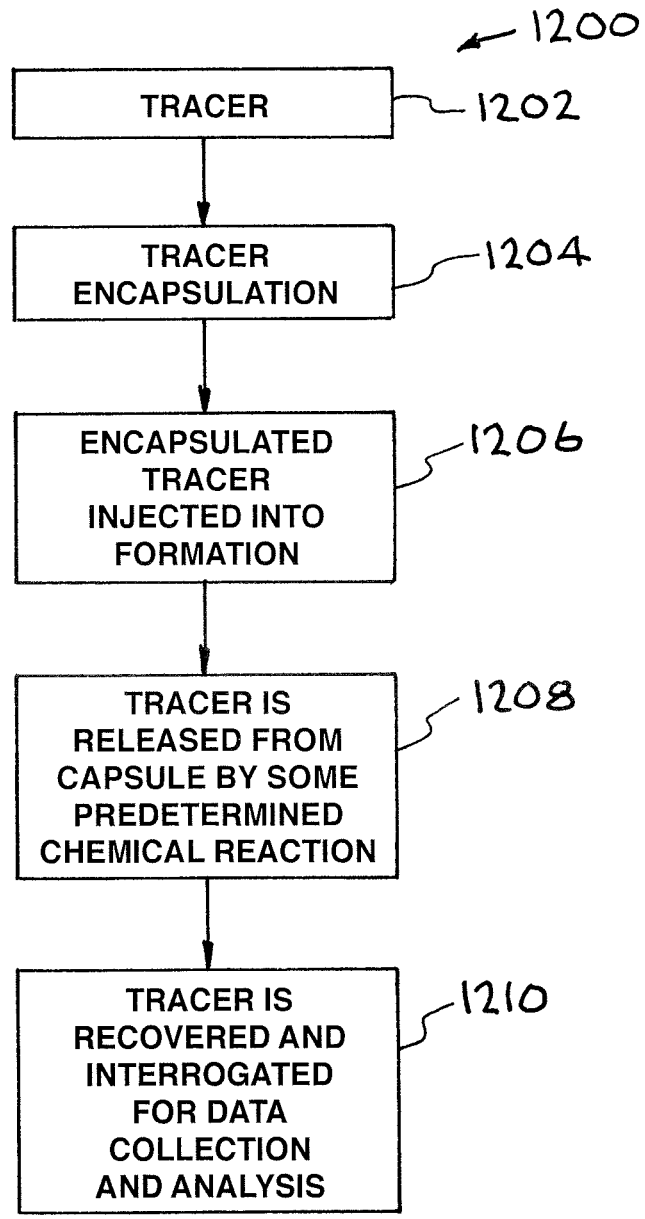
FIG. 12 is an example of the invention wherein the tracer is released into the reservoir at a predetermined chemical condition.

Referring now to FIG. 12, another example of the present invention is illustrated by a flow chart. The flow chart illustrates an apparatus, method, and system of reservoir interrogation. The apparatus, method, and system of reservoir interrogation are designated generally by the reference numeral 1200.

In step 1 a tracer is provided. Step 1 is designated by the reference numeral 1202 in the flow chart of FIG. 12. The tracer is a tracer that can be used in all applications that currently use conventional tracer techniques. In one embodiment the tracer is a standard tracers such as fluorescein disodium hydrate and 2,6-napthalein disulfonic acid sodium salt. The appearance of the tracer and the concentration is commonly measured using HPLC with a fluorescence detector. In various embodiments of the invention multiple tracers are used, each contained in capsules that release the tracer after contact with specific conditions or the capsule is recovered with the capsule intact and the analyzed. In this way, reservoir conditions can be more accurately determined.

The tracer is encapsulating in a receptacle in step 2. Step 2 is designated by the reference numeral 1204 in the flow chart of FIG. 12. The receptacle can be made of different materials and different wall thicknesses to achieve the desired result. The receptacle is designed to release the tracer after exposure to a pre-determined chemical reaction. The receptacle shell can be any number of polymer or other materials which are designed to dissolve, erode, or otherwise degrade under specific environmental conditions of chemical reaction.

In step 3 the receptacle containing the tracer is injected into the reservoir. Step 3 is designated by the reference numeral 1206 in the flow chart of FIG. 12.

In step 4 the receptacle releases the tracer at the predetermined chemical reaction. Step 4 is designated by the reference numeral 1208 in the flow chart of FIG. 12.

In step 5 the tracer is recovered and analyzed for reservoir interrogation. Step 5 is designated by the reference numeral 1210 in the flow chart of FIG. 12. For example, the tracer can be analyzed for reservoir interrogation using tests that are a standard method for obtaining information about the interconnectedness of individual wells, pathways, sweep efficiency, reservoir storage volume, and the types of fluid at depth (through the use of tracers that have distinct distribution coefficients). Subterranean fluids whose movements are capable of being monitored by these tracers include, but are not limited to, geothermal brine, crude oil, ground water, hazardous waste, and injected fluids used in enhanced oil recovery operations, e.g., steam floods, carbon dioxide floods, caustic floods, micellar-polymer floods, and straight polymer floods.

Example 9

Hazardous Waste

In an additional version of the invention, the source of a hazardous waste is identified. For example, a hazardous waste can appear, among other places, in a subterranean potable water source or in the basement of a building. There may be two or more operators proximate the contaminated area handling the same hazardous waste. To determine which operator is responsible for the pollution (as well as the source of the pollution), a different tracer is incorporated into each of the operators' wastes.

The present invention provides a method of reservoir interrogation including the steps of microencapsulation of a tracer so that the microencapsulated tracer will be released when it comes into contact with fluids of a predetermined temperature or a predetermined chemistry or a predetermined time; injecting the microencapsulated tracer into a geologic formation; and recovering the tracer once it is released. In one embodiment the method of reservoir interrogation the step of microencapsulation of a tracer so that the microencapsulated tracer will be released when it comes into contact with fluids of a predetermined temperature, a predetermined chemistry, or a predetermined time comprises microencapsulation of the tracer with a preselected material or a preselected wall thickness so that the microencapsulated tracer will be released when it comes into contact with fluids of a predetermined temperature, a predetermined chemistry, or a predetermined time. In another embodiment method of reservoir interrogation the step of microencapsulation of a tracer so that the microencapsulated tracer will be released when it comes into contact with fluids of a predetermined temperature, a predetermined chemistry, or a predetermined time comprises microencapsulation of the tracer with a shell having a reactant in the shell that changes chemical constituent or color or fluorescence or other property at a predetermined temperature range or a predetermined condition; collecting the microencapsulation tracer; and interrogating the microencapsulation tracer to determine the changes in chemical constituent or color or fluorescence or other property.

If a particular operator is handling the hazardous waste at more than one location, it is preferable to incorporate a different tracer into each waste that is processed at a separate location. By periodically analyzing samples from the polluted area, the operator and location responsible for the pollution can be identified and corrective action can then be commenced.

Example 10

Steam Flood

Another exemplary process of the present invention entails monitoring the fluids injected during a steam flood. In this version of the invention, the steam is typically injected using a 5-spot or 9-spot injection-producer pattern. Occasionally, early steam breakthrough occurs at a producer well. To determine which of the injection wells is channeling its injected fluid to the producer well, a different tracer is added to each of the steam injection wells designed to service the affected producer well. By analyzing samples of the produced fluids, the injection well responsible for the early breakthrough is identifiable and, once identified, remedial action can be taken.

The interrogation includes the steps of microencapsulation of the tracer so that the microencapsulated tracer will be released when it comes into contact with fluids of a predetermined temperature or a predetermined chemistry or a predetermined time; injecting the microencapsulated tracer into a geologic formation; and recovering the tracer once it is released. In one embodiment the method of reservoir interrogation the step of microencapsulation of a tracer so that the microencapsulated tracer will be released when it comes into contact with fluids of a predetermined temperature, a predetermined chemistry, or a predetermined time comprises microencapsulation of the tracer with a preselected material or a preselected wall thickness so that the microencapsulated tracer will be released when it comes into contact with fluids of a predetermined temperature, a predetermined chemistry, or a predetermined time. In another embodiment method of reservoir interrogation the step of microencapsulation of a tracer so that the microencapsulated tracer will be released when it comes into contact with fluids of a predetermined temperature, a predetermined chemistry, or a predetermined time comprises microencapsulation of the tracer with a shell having a reactant in the shell that changes chemical constituent or color or fluorescence or other property at a predetermined temperature range or a predetermined condition; collecting the microencapsulation tracer; and interrogating the microencapsulation tracer to determine the changes in chemical constituent or color or fluorescence or other property.

Example 11

Geothermal

A geothermal field will be used to illustrate one process of the present invention. A geothermal field usually comprises one or more production wells for producing geothermal brine from one or more subterranean geothermal reservoirs. Heat is extracted from the produced brine and the resulting modified brine is either injected into a subterranean formation through one or more injection wells or disposed of in another manner. Occasionally, water or different brine is injected to recharge the formation.

In order to determine whether the fluid injected into a specific injection well is adversely affecting the produced geothermal brines (e.g., causing a cooling effect), a tracer is incorporated into that injected fluid and at least one brine sample from each of one or more of the production wells (and preferably from each of all of the production wells) is periodically assayed for its presence.

The present invention provides a method of reservoir interrogation including the steps of microencapsulation of a tracer so that the microencapsulated tracer will be released when it comes into contact with fluids of a predetermined temperature or a predetermined chemistry or a predetermined time; injecting the microencapsulated tracer into a geologic formation; and recovering the tracer once it is released. In one embodiment the method of reservoir interrogation the step of microencapsulation of a tracer so that the microencapsulated tracer will be released when it comes into contact with fluids of a predetermined temperature, a predetermined chemistry, or a predetermined time comprises microencapsulation of the tracer with a preselected material or a preselected wall thickness so that the microencapsulated tracer will be released when it comes into contact with fluids of a predetermined temperature, a predetermined chemistry, or a predetermined time. In another embodiment method of reservoir interrogation the step of microencapsulation of a tracer so that the microencapsulated tracer will be released when it comes into contact with fluids of a predetermined temperature, a predetermined chemistry, or a predetermined time comprises microencapsulation of the tracer with a shell having a reactant in the shell that changes chemical constituent or color or fluorescence or other property at a predetermined temperature range or a predetermined condition; collecting the microencapsulation tracer; and interrogating the microencapsulation tracer to determine the changes in chemical constituent or color or fluorescence or other property.

To determine which of a plurality of injection wells is injecting fluids adversely impacting brine produced from one or more production wells, a different tracer is incorporated into each of a plurality of fluid streams injected into respective injection wells. In this version, samples of the brines produced from one or more of the production wells (preferably from each of the production wells) are also periodically analyzed for the presence of these tracers. By judiciously selecting the tracers, a single analysis is used to check each sample for the presence of all tracers employed in the monitoring program—thereby saving a significant amount of analytical time, effort, and money.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of interrogation of a reservoir penetrated by an injection borehole and penetrated by a recovery borehole wherein the reservoir has a predetermined temperature, comprising the steps of:
encapsulating a tracer in a receptacle wherein said receptacle has a surface layer made of a polymer wherein said polymer is made of polymerizable or crosslink-able materials that will erode or degrade upon encountering the predetermined temperature,
said step of encapsulating a tracer in a receptacle including directing a first fluid containing said tracer through a round injection tube into a second fluid containing said polymer so that a droplet of said first fluid containing said tracer is formed in said second fluid containing said polymer wherein said second fluid containing said polymer forms said surface layer around said droplet and produces said receptacle,
injecting said receptacle and said tracer into the reservoir through the injection borehole wherein said polymer surface layer erodes or degrades upon encountering the predetermined temperature releasing said tracer into the reservoir,
recovering said tracer from said reservoir through the recovery borehole, and
analyzing said tracer for reservoir interrogation.

2. The method of interrogation of a reservoir penetrated by an injection borehole and penetrated by a recovery borehole wherein the reservoir has a predetermined temperature of claim 1 wherein said step encapsulating a tracer in a receptacle wherein said receptacle has a surface layer made of a polymer wherein said polymer is made of polymerizable or crosslink-able materials that will erode or degrade upon encountering the predetermined temperature includes providing a first shell made of polymerizable or crosslink-able materials that will erode or degrade upon encountering the predetermined temperature and containing a first encapsulated tracer and a second encapsulated trace within said first shell.

3. The method of interrogation of a reservoir penetrated by an injection borehole and penetrated by a recovery borehole wherein the reservoir has a predetermined temperature of claim 1 wherein said tracer is fluorescein disodium hydrate and 2,6-napthalein disulfonic acid sodium salt.

4. The method of interrogation of a reservoir penetrated by an injection borehole and penetrated by a recovery borehole wherein the reservoir has a predetermined temperature of claim 3 wherein said step of analyzing said tracer for reservoir interrogation comprises analyzing said fluorescein disodium hydrate and 2,6-napthalein disulfonic acid sodium salt using HPLC with a fluorescence detector.

5. A method of interrogation of a reservoir penetrated by a well wherein the reservoir has a predetermined chemical composition, comprising the steps of:
encapsulating a tracer in a receptacle wherein said receptacle has a surface layer made of a polymer wherein said polymer is made of polymerizable or crosslink-able materials that will dissolve, erode, or degrade upon encountering the predetermined chemical composition,
said step of encapsulating a tracer in a receptacle including directing a first fluid containing said tracer through a round injection tube into a second fluid containing said polymer so that a droplet of said first fluid containing said tracer is formed in said second fluid containing said polymer wherein said second fluid containing said polymer forms said surface layer around said droplet and produces said receptacle,
injecting said receptacle and said tracer encapsulated in a receptacle into the reservoir through the well wherein said polymer surface layer of said tracer dissolves, erodes, or degrades upon encountering the predetermined chemical composition and said tracer will be released from said receptacle and
analyzing said tracer upon said tracer being released from said receptacle after encountering said pre-determined chemical composition and analyzing said collected tracer for reservoir interrogation.

6. The method of interrogation of a reservoir penetrated by a well wherein the reservoir has a predetermined chemical composition of claim 5 wherein said step of encapsulating a tracer in a receptacle wherein said receptacle has a surface layer made of a polymer wherein said polymer is made of polymerizable or crosslink-able materials that will dissolve, erode, or degrade upon encountering the predetermined chemical composition includes providing a first shell made of polymerizable or crosslink-able materials that will dissolve, erode, or degrade upon encountering the predetermined chemical composition and containing a first encapsulated tracer and a second encapsulated trace within said first shell.

7. The method of interrogation of a reservoir penetrated by a well wherein the reservoir has a predetermined chemical composition of claim 5 wherein said tracer is fluorescein disodium hydrate and 2,6-napthalein disulfonic acid sodium salt.

8. The method of interrogation of a reservoir penetrated by a well wherein the reservoir has a predetermined chemical composition of claim 7 wherein said step of analyzing said tracer upon said tracer being released from said receptacle after encountering said pre-determined chemical composition and analyzing said collected tracer for reservoir interrogation comprises analyzing said fluorescein disodium hydrate and 2,6-napthalein disulfonic acid sodium salt using HPLC with a fluorescence detector.

9. An apparatus for interrogation of a reservoir penetrated by an injection borehole and penetrated by a recovery borehole wherein the reservoir has a predetermined temperature, comprising:
   a system for encapsulating a tracer in a receptacle that includes
   a first fluid containing said tracer,
   a second fluid containing a polymer made of polymerizable or crosslink-able materials that will erode or degrade upon encountering the predetermined temperature,
   a round injection tube, wherein said first fluid containing said tracer is directed through said round injection tube into said second fluid containing said polymer so that a droplet of said first fluid containing said tracer is formed in said second fluid containing said polymer wherein said second fluid containing said polymer forms a polymer surface layer around said droplet and produces said tracer encapsulated in said receptacle,
   an injection system that injects said tracer encapsulated in a receptacle into the reservoir through the injection borehole wherein said polymer erodes or degrades upon encountering the predetermined temperature releasing said tracer into the reservoir,
   a recovery system that recovers said tracer from said reservoir through the recovery borehole, and
   an analyzer that analyzes said tracer for reservoir interrogation.

10. An apparatus for interrogation of a reservoir penetrated by a well wherein the reservoir has a predetermined chemical composition, comprising:
    a system for encapsulating a tracer that includes
    a first fluid containing said tracer,
    a second fluid containing a polymer made of polymerizable or crosslink-able materials that will erode or degrade upon encountering the predetermined chemical composition,
    a round injection tube, wherein said first fluid containing said tracer is directed through said round injection tube into said second fluid containing said polymer so that a droplet of said first fluid containing said tracer is formed in said second fluid containing said polymer wherein said second fluid containing said polymer forms a polymer surface layer around said droplet and produces said tracer encapsulated in said receptacle,
    an injection system that injects said tracer encapsulated in a receptacle into the reservoir through the well wherein said polymer erodes or degrades upon encountering the predetermined chemical composition releasing said tracer into the reservoir, and
    an analyzer that analyzes said tracer for reservoir interrogation.

11. The apparatus for interrogation of a reservoir penetrated by a well wherein the reservoir has a predetermined chemical composition of claim 10 wherein said tracer is fluorescein disodium hydrate and 2,6-napthalein disulfonic acid sodium salt.

12. The apparatus for interrogation of a reservoir penetrated by a well wherein the reservoir has a predetermined chemical composition of claim 10 wherein said analyzer that analyzes said tracer for reservoir interrogation is an analyzer that analyzes said fluorescein disodium hydrate and 2,6-napthalein disulfonic acid sodium salt using HPLC with a fluorescence detector.

* * * * *